United States Patent
Lee et al.

(10) Patent No.: US 6,797,781 B2
(45) Date of Patent: Sep. 28, 2004

(54) BLENDS OF FLUOROPOLYMER AND PLASTICIZED POLYVINYL CHLORIDE

(75) Inventors: Biing-Lin Lee, Cranston, RI (US); James L. White, Akron, OH (US); Cheol-Ho Choi, Cuyahoga Falls, OH (US); Maryellen Cobb, Warrick, RI (US); Raman Patel, Cumberland, RI (US)

(73) Assignee: Teknor Apex Company, Pawtucket, RI (US)

( * ) Notice: Subject to any disclaimer, the term of this patent is extended or adjusted under 35 U.S.C. 154(b) by 0 days.

(21) Appl. No.: 10/133,525

(22) Filed: Apr. 26, 2002

(65) Prior Publication Data

US 2003/0204021 A1 Oct. 30, 2003

(51) Int. Cl.$^7$ .......................... C08L 27/06; C08L 27/08; C08L 27/12
(52) U.S. Cl. .................. 525/199; 525/200; 525/239
(58) Field of Search .................. 525/199, 200, 525/239

(56) References Cited

U.S. PATENT DOCUMENTS

| | | | |
|---|---|---|---|
| 4,123,585 A | 10/1978 | Sparzak et al. | |
| 4,151,225 A | 4/1979 | Buningu | |
| 4,886,689 A | 12/1989 | Kotliar et al. | |
| 4,904,735 A | 2/1990 | Chapman, Jr. et al. | 525/199 |
| 5,013,792 A | 5/1991 | Chapman, Jr. et al. | 525/166 |
| 5,132,368 A | 7/1992 | Chapman, Jr. et al. | 525/165 |
| 5,576,106 A | 11/1996 | Kerbow et al. | 428/403 |
| 5,614,319 A * | 3/1997 | Wessels et al. | 428/379 |
| 6,054,538 A * | 4/2000 | Thulliez et al. | 525/199 |
| 6,355,380 B1 | 3/2002 | Yun et al. | |

FOREIGN PATENT DOCUMENTS

| | | |
|---|---|---|
| EP | 0 650 987 A1 | 5/1995 |
| EP | 0 677 381 A1 | 10/1995 |
| EP | 0 709 429 A1 | 5/1996 |
| EP | 1 188 555 A2 | 3/2002 |

OTHER PUBLICATIONS

C. Garbuglio et al., "Copolymerization of ethylene and chlorotrifluoroethylene by trialkylboron catalysts–II", *European Polymer Journal*, Tokyo (1967) @ pp. 137–144.

* cited by examiner

*Primary Examiner*—Nathan M. Nutter
(74) *Attorney, Agent, or Firm*—Perkins Smith & Cohen; Stephen Y. Chow

(57) ABSTRACT

A melt-mixed blend of plasticized PVC, fluoropolymers, and a compatibilizer having acrylate functionality exhibits good mechanical and dielectric properties and is useful for wiring and cable applications.

22 Claims, No Drawings

BLENDS OF FLUOROPOLYMER AND PLASTICIZED POLYVINYL CHLORIDE

FIELD OF THE INVENTION

This invention relates to blends of fluoropolymer and plasticized poly(vinyl chloride) and its copolymers.

BACKGROUND

Fluoropolymers and PVC compounds are widely used in various wire and cable applications. For example, category 3 plenum cables typically consist of PVC plenum compounds as the insulation and jacket materials. Category 5 cables typically consist of fluoropolymers as insulation material and PVC plenum compounds as the jacket material. The fluoropolymer commonly used is FEP (fluorinated ethylene/propylene copolymer). Category 6 and 7 cables consist of fluoropolymers as insulation and jacket materials. FEP is typically the fluoropolymer used in these applications.

Fluoropolymers have been used as processing aids in polymer blend compositions for some time. For example, U.S. Pat. No. 4,904,735 (Chapman, Jr., et al.), U.S. Pat. No. 5,013,792 (Chapman, Jr., et al.), and U.S. Pat. No. 5,132,368 (Chapman, Jr., et al.) disclose using a minor amount of one or more fluoropolymers as a processing aid in a difficultly melt-processible polymer. The amount of fluoropolymer used as a processing aid is typically less than a couple of percent.

The process of grafting fluoropolymers is known in the prior art. For example, U.S. Pat. No. 5,576,106 (Kerbow et al.) discloses a process for grafting an ethylenically unsaturated compound onto the surface of the particles of fluoropolymer powder. The ethylenically unsaturated compound provides polar functionality to the fluoropolymer. The utility of the resultant grafted fluoropolymer powder is disclosed to act as an adhesive to adhere dissimilar materials together, such as tetrafluoroethylene/ethylene (ETFE) copolymer to polyamide.

The use of a methylacrylic polymer as a compatibilizer is also known in the prior art. For example, U.S. Pat. No. 6,054,538 (Thulliez et al.) discloses compositions based on vinylidene fluoride copolymers plus PVC, and an effective amount of methylacrylic polymer as a compatibilizer. The weight ratio of vinylidene fluoride copolymer to PVC is at least 1.2. That means the blend contains more than 50 wt % of fluoropolymer in the blend.

The fluoropolymers mentioned in these disclosures are not suitable to be mixed with PVC. Several inherent barriers inhibit the blending of PVC with fluoropolymers by conventional means. The barriers include differences in compatibility and processing temperatures. A development of PVC/fluoropolymer blends would enhance the properties of PVC blend compounds to be used in high frequency cable applications. There is a need for polymer blends with a blend ratio of PVC to fluoropolymer larger than 1.0 with good mechanical properties and electrical properties for high frequency cable applications.

It is therefore an object of this invention to provide a blend of PVC/fluoropolymer for wire and cable applications.

SUMMARY OF THE INVENTION

The object set forth above as well as further and other objects and advantages of the present invention are achieved by the embodiments of the invention described hereinbelow.

It has now been discovered that acrylate-grafted fluoropolymer can be melt-blended with plasticized PVC and fluoropolymer to produce a dispersion of the fluoropolymer in a matrix of plasticized PVC, so as to provide improvements of tensile elongation, dielectric properties, flame retardancy, and reduction of smoke generation for use in wire and cable applications. In one aspect, the present invention provides a melt-mixed blend, comprising plasticized PVC as the matrix of the blend and fluoropolymer as the dispersed phase and the acrylate-grafted fluoropolymer as the compatibilizer to improve the dispersion of fluoropolymer. The melt-mixed blend has improved electrical and physical properties for use in high frequency wire and cable applications.

DETAILED DESCRIPTION OF PREFERRED EMBODIMENTS

The melt-mixed blend of the present invention comprises a plasticized PVC, a fluoropolymer and an acrylate-grafted fluoropolymer.

PVC resins that can be used in this invention as the PVC component of the melt-mixed blend are homo PVC or copolymer of PVC, with an IV ranging from 0.8 to 1.4.

The PVC is present as the matrix of the melt-mixed blend of the present invention. That is, the PVC component forms the continuous phase of the melt-mixed blend.

With respect to the fluoropolymer component of the melt-mixed blend of the present invention, a wide variety of fluoropolymers can be used which are melt-extrudable at a temperature less than 230° C.

The fluoropolymers are the copolymers of ethylene with perhalogenated monomers such as tetrafluoroethylene (TFE) or chlorotrifluoroethylene (CTFE), such copolymers being often referred to as ETFE and ECTFE, respectively. In the case of ETFE, minor amounts of additional monomer are commonly used to improve properties such as reduced high temperature brittleness. Perfluoro(propyl vinyl ether) (PPVE), perfluoro(ethyl vinyl ether) (PEVE), perfluorobutyl ethylene (PFBE), and hexafluoroisobutylene (HFIB) are preferred additional comonomers. ECTFE may also have additional modifying comonomer.

The preferred fluoropolymers are ECTFE. U.S. Pat. No. 5,962,610 (Abusleme, et al) describes ethylene fluoro-containing copolymers of the ECTFE and ETFE type. Such fluoropolymers are usually partially-crystalline as indicated by a non-zero heat of fusion associated with a melting endotherm as measured by DSC on first melting. In the present invention, two different grades of a commercial ECTFE powder (Halar 353, Ausimont and Halar 476, Ausimont) were used which could be subsequently processed at a temperature below 210° C.

| ECTFE | Halar XPH 476 | Halar XPH 353 |
|---|---|---|
| Dielectric constant | 2.67 | 2.42 |
| Dissipation factor | 0.026 | 0.011 |

Though the exact composition of the two grades of ECTFE was not provided by the supplier, the published literature suggests that both powders contain at least 40 to 60 molar percent of ethylene ($C_2H_4$). See "Copolymerization of Ethylene and Chlorotrifluoroethylene by Trialkylboron Catalysts-II. Physico-Chemical Characterization of the Copolymers" by C. Garbuglio et al., European Polymer Journal, Vol. 3, pp 137–144 (1967).

Other fluoropolymers that can be used include vinylidene fluoride polymers including homopolymers and copolymers with other perfluoroolefins, particularly hexafluoropropylene (HFP), and chlorotrifluoroethylene (CTFE), and optionally TFE. TFE/HFP copolymer which contains a small amount of vinylidene fluoride, which copolymer is often referred to as THV, can also be used. When vinylidene fluoride polymer is used, the technological application of the blends is not for high frequency cables.

In one aspect of this invention, the fluoropolymer is functionalized by having an acrylate grafted thereto, which imparts compatibility to the blends of PVC and fluoropolymers. More particularly, the grafting is done by melt mixing a fluorine-containing polymer having hydrogen atoms bonded to main-chain carbon atoms, a grafting compound such as methyl methacrylate (MMA), butyl methacrylate (BMA), vinyl acetate, and butyl acrylate, and a radical-forming agent (peroxide). Preferably, the reaction composition is further purified by precipitation into cold acetone from a hot xylene solution. In attempts to evaluate this grafting technology, FTIR is used to confirm the existence of acrylate-grafted copolymer.

The amount of grafted-ECTFE copolymer used in the blend is in an amount that is effective to improve the dispersion of fluoropolymer in melt mixing of the blend of plasticized PVC and fluoropolymer. Generally, the amount of grafted copolymer is in the range of 2.0 wt % to 30 wt % based on the total weight of the resultant PVC and fluoropolymer. Preferably, the amount of grafted ECTFE copolymer is 3 to 10 wt %, more preferably 3 to 6 wt %. The acrylate grafted ECTFE copolymer is prepared prior to the melt blending of PVC and ECTFE.

As one skilled in the art will recognize, it is possible to carry out other chemical reactions of different functionality-grafted fluoropolymer to alter the grafted entity and thereby achieve different effects. Products of derivative reactions can be maleic anhydride, caprolactone, and acrylic acid.

The acrylate-grafted fluoropolymer improves the dispersion of fluoropolymer when melt-mixed with PVC and fluoropolymer. That is, the presence of the acrylate-g-ECTFE copolymer makes the fluoropolymer generally well dispersed (uniformly dispersed) in the blend.

The incorporation of the acrylate-g-ECTFE results in the melt-mixed blend of the invention having surprisingly good mechanical properties, improved dielectric properties, and reduced smoke generation, and improved flame properties that is useful for wire and cable applications.

The melt-mixed blend of the present invention is preferably prepared by melt blending the ingredients together under high shear. The ingredients can first be combined in desired proportions and blended with each other in the dry state, such as by tumbling in a drum, or can be combined by simultaneous or separate metering of the feed of one or more of the components to the melt blending device. Preferably, the melt blending is done in a twin screw extruder, such as manufactured by Werner & Pfleiderer or by Berstorff. Numerous other high shear melt blending devices, such as a counter-rotating twin screw extruder, Banbury internal mixer, as known to those skilled in the art, can be used without departing from the spirit of the invention.

One skilled in the art will recognize that the acrylate-grafted fluoropolymer component used to prepare a melt-mixed blend of the present invention can itself be a blend. Thus, for example, the acrylate-grafted fluoropolymer component can be a blend of two or more acrylate-grafted fluoropolymers. Additionally, the fluoropolymer component in the melt-mixed blend of the present invention may itself be an acrylate-grafted fluoropolymer, or a blend of acrylate-grafted fluoropolymer and a fluoropolymer.

EXAMPLES

The invention is now further disclosed with reference to the following non-limiting examples. Unless otherwise specified, the fluoropolymer used is Halar XPH 353 ECTFE (Ausimont).

I. Examples of Properties of Blends of PVC/ECTFC Without a Compatibilizer

| | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| PVC | 100 | — | 100 | 100 | 100 | 100 | 100 | 100 | 100 | 100 |
| plasticizer | 30 | — | 30 | 30 | 30 | 30 | 30 | 30 | 30 | 30 |
| stabilizer | 6 | — | 6 | 6 | 6 | 6 | 6 | 6 | 6 | 6 |
| Stearic acid | 0.3 | — | 0.3 | 0.3 | 0.3 | 0.3 | 0.3 | 0.3 | 0.3 | 0.3 |
| plasticized Halar XPH 353 | — | 100 | 10 | 20 | 30 | 40 | 50 | 75 | 100 | 140 |
| Tensile Properties | | | | | | | | | | |
| Tensile strength, plaque | 4400 | 3700 | 3200 | 3000 | 2580 | 2300 | 2250 | 2260 | 2040 | 1780 |
| % elongation, | 127 | 320 | 250 | 240 | 110 | 90 | 80 | 100 | 75 | 90 |

-continued

|  | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| plaque Dielectric Properties |  |  |  |  |  |  |  |  |  |  |
| Dielectric constant, 1 MHz | 2.89 | 2.54 | 2.84 | 2.83 | 2.78 | 2.82 | 2.77 | 2.75 | 2.7 | 2.71 |
| Dissipation factor, 1 MHz | 0.033 | 0.017 | 0.031 | 0.031 | 0.03 | 0.032 | 0.031 | 0.031 | 0.03 | 0.031 |
| Oxygen index | 29.5 | 47.5 | 29 | 29.5 | 28.5 | 30.5 | 31 | 33.5 | 36 | 36 |

These blend compositions were melt-mixed at 190° C. Ex. 1 and Ex. 2 showed the properties of plasticized PVC and ECTFE. The incorporation of ECTFE to PVC decreased the elongation to break (Ex. 3 to Ex. 10). For instance, Ex. 6, mixing 40 phr of ECTFE to PVC, the % elongation of the blend is just 90%, which is not suitable for wire and cable applications.

II. PVC/ECTFE Blends with a Third Polymer Component

|  | Control A | Control B | Control C | P3 | E2 | E3 |
|---|---|---|---|---|---|---|
| PVC |  | 100 | 100 | 100 | 100 | 100 |
| Plasticizer |  | 30 | 30 | 30 | 30 | 30 |
| stabilizer |  | 6 | 6 | 6 | 6 | 6 |
| Lubricant |  | 0.3 | 0.3 | 0.3 | 0.3 | 0.3 |
| ECTFE | 100 |  | 40 | 40 | 40 | 40 |
| Paraloid K120ND |  |  |  | 5 | — | — |
| Elvaloy AS |  |  |  |  | 5 | 10 |
| Tensile strength, psi | 4078 | 4300 | 2450 | 2620 | 2100 | 2130 |
| % elongation | 350 | 130 | 80 | 100 | 100 | 30 |
| Dielectric constant (1 MHz) | 2.48 | 2.89 | 2.78 | 2.8 | 2.85 | 2.82 |
| Dissipation factor (1 MHz) | 0.015 | 0.032 | 0.030 | 0.030 | 0.028 | 0.023 |

As shown in the table, the incorporation of Paraloid K120ND (an acrylic processing aid generally used in PVC compounding) (P3) and Elvaloy AS (an epoxy modified ethylene/vinyl acetate/carbon monoxide terpolymer) (E2 and E3) did not improve the tensile properties to the target 300% range for a viable blend for further compounding with flame retardants and smoke suppressants for high frequency cable application. These blends were processed at 190° C.

III. ECTFE-g-poly(MMA) as a Compatibilizer for Blends of PVC/ECTFE

The ECTFE-g-poly(MMA) compound according to this example is prepared as follows: A mixture of ECTFE, 0.5 phr peroxide, 8 phr MMA was mixed using a Brabender internal mixer at 200° C. for 10 min. The composition of the as-reacted mixture consists of ECTFE-g-poly(MMA), ECTFE, and possibly PMMA. The grafted polymers were purified by precipitation into cold acetone from a xylene solution at 130° C. The amount of MMA in the grafted ECTFE is about 0.13%. The MMA-grafted-copolymer may be made to a fine powder during this stage of purification/precipitation process.

A higher level of MMA can be grafted to ECTFE. In this case, a higher concentration of MMA, and a temperature lower than 200° C. are operated to perform the melt grafting reaction. A mixture of ECTFE, 0.5 phr peroxide, 20 phr MMA was mixed using a Brabender internal mixer at 190° C. for 10 min. The grafted polymers were purified by precipitation into cold acetone from a xylene solution at 130° C. The amount of MMA in the grafted ECTFE is about 0.24%.

Furthermore, a higher level of MMA can also be grafted to ECTFE by the incorporation of styrene as a co-monomer to MMA for grafting. In this case, a higher concentration of MMA, and a temperature lower than 200° C. are operated to perform the melt grafting reaction. A mixture of ECTFE, 0.5 phr peroxide Luperox 130 (Elf Atochem), 4 phr MMA and 4 parts styrene were mixed using a Brabender internal mixer at 200° C. for 10 min. The grafted polymers were purified by precipitation into cold acetone from a xylene solution at 130° C. The amount of MMA in the grafted ECTFE is about 0.92%.

Different peroxide may be used as the free radical initiators. Examples are dicumyl peroxide (Alrich), Luperox 130 (2,5-Bis(tert-butylperoxy)-2,5-dimethyl-3-hexyne (Elf Atochem), Luperox CU90 (Cumene Hydroperoxide) (Elf Atochem), and Vul-cup® [di(2-tert-butylperoxyisopropyl benzene] (Hercules).

IV. Butyl Methacrylate (BMA)-g-Halar 353 as a Compatibilizer for PVC/ECTFE

BMA can also be grafted onto ECTFE. The BMA grafted copolymer were produced with a peroxide initiator (dicumyl peroxide) in a Brabender internal mixer. The reaction mixture of ECTFE, 1 phr of peroxide, and 20 phr of BMA were mixed at 195° C. for 10 minutes. The % BMA in the grafted copolymer is 3%. That means, there are 3 units of BMA per 100 ECTFE units in the grafted copolymer.

The acrylate-g-ECTFE, such as MMA-g-ECTFE or BMA-g-ECTFE, were then evaluated as a viable compatibilizer in the following blend composition of PVC/ECTFE using a Brabender at 200° C.

V. Example of Blends of PVC/ECTFE/ECTFE-g-poly(MMA)

|  | AK 1 | AK 2 | AK 3 | AK 4 | AK 5 (Control B) | AK 6 (Control A) |
|---|---|---|---|---|---|---|
| PVC | 100 | 100 | 100 | 100 | 100 | 0 |
| ECTFE | 40 | 40 | 40 | 40 | 0 | 100 |
| MMA-g-ECTFE | 0 | 1 | 3 | 5 | 0 | 0 |
| plasticizer | 30 | 30 | 30 | 30 | 30 | 0 |
| stabilizer | 6 | 6 | 6 | 6 | 6 | 0 |
| Stearic acid | 0.3 | 0.3 | 0.3 | 0.3 | 0.3 | 0 |
| Tensile strength, psi | 2400 | 2900 |  | 3200 | 4300 | 4100 |
| % elongation | 220 | 270 |  | 380 | 130 | 350 |

|  | BLLF10-B | BLLF11 |
|---|---|---|
| PVC | 100 | 100 |
| ECTFE | 40 | 40 |
| MMA-g-ECTFE (lot 801-1) | 0 | 5 |
| Plasticizer | 30 | 30 |
| Stabilizer | 6 | 6 |
| Stearic acid | 0.3 | 0.3 |
| Dielectric constant @ 1 MHz, Room Temp | 2.79 | 2.71 |
| Dielectric dissipation factor @ 1 MHz, Room Temp | 0.031 | 0.028 |

Comparing AK 1 with AK 2, 3 and 4, it showed that the addition of ECTFE-g-poly(MMA) to blends of PVC/ECTFE improved the elongation of the blends from 220% to 380%, and the tensile strength from 2400 psi to 3200 psi.

As shown in the above two tables, the technological importance of the incorporation of ECTFE-g-poly(MMA) to blend of PVC/ECTFE are at least two-fold.

(1) improvement of the tensile strength, and elongation to break, and (2) improvement of the dispersion of ECTFE in the blend matrix, Surprisingly, the incorporation of ECTFE-g-PMMA to the blends of PVC/ECTFE also decreases the dielectric dissipation factor (see BLLF10-B vs. BLLF11).

The following examples illustrate the effect of the amount of MMA grafted to ECTFE on the blend properties. The ECTFE-g-poly(MMA) (lot 914-1) is prepared according to this invention at 190° C. for increasing the amount of MMA grafted from 0.13% to 0.24%.

|  | AKII-5-1 | AKII-5-2 | AKII-5-3 | AKII-5-4 | AKII-6 |
|---|---|---|---|---|---|
| PVC | 100 | 100 | 100 | 100 | 100 |
| ECTFE | 40 | 40 | 40 | 40 | 40 |
| ECTFE-g-poly(MMA) (801-1) (0.13% MMA grafted) | 0 | 1 | 3 | 5 | 0 |
| ECTFE-g-poly(MMA) (914-1) (0.24% MMA grafted) | 0 | 0 | 0 | 0 | 3 |
| plasticizer | 30 | 30 | 30 | 30 | 30 |
| stabilizer | 6 | 6 | 6 | 6 | 6 |
| Stearic acid | 0.3 | 0.3 | 0.3 | 0.3 | 0.3 |
| % elongation | 220 | 250 | 270 | 350 | 300 |

When the amount of MMA that is grafted to ECTFE is increased to 0.24%, the grafted compatibilizer is also very efficient to improve the elongation to break of the PVC/ECTFE blend. (see AKII-5-3 vs. AKII-6).

The as-reacted mixture may be used without further purification to blend with PVC and ECTFE for the improvement of tensile elongation of the blends.

VI. Molten State Premixed Blends of Ethylene Acrylate Copolymer and ECTFE as a Compatibilizer Ethylene acrylate copolymer is known to be compatible with PVC. The material is available from Du Pont Polymers, under the trade name of Elvaloy. In the following series of evaluation, elongation to break is used as the screening criterion of mechanical compatibility. These blends were prepared using a Brabender at 200° C. It appears that a certain composition of Elvaloy may be functioned as a "compatibilizer" for blends of PVC/ECTFE. An additional technological advantage of this approach is that Elvaloy also decreases the melt viscosity for extrusion.

In this premixed Ethylene acrylate copolymer/ECTFE approach, the blends of PVC/ECTFE are to be prepared as follows:

Step 1: Melt mixing of ECTFE and Ethylene acrylate copolymer;

Step 2: Addition of Plasticized PVC to ECTFE and the pre-blend of ECTFE/Ethylene acrylate copolymer, depending on the final composition.

The molecular weight of PVC resin used in this approach can be a little bit higher than that used in the conventional PVC cable. In turn, this approach could further improve the tensile properties of the resultant blends.

| Formula | BLL06-15-A | BLL06-15-E | BLL06-15-H | BLL06-15-N | BLL06-15-Q |
|---|---|---|---|---|---|
| Halar XPH 353 | 100 | 90 | 90 | 90 | 90 |
| stabilizer | 6 | 6 | 6 | 6 | 6 |
| Elvaloy 492P | | 10 | | | |
| Elvaloy 4924P | | | 10 | | |
| Elvaloy 4051 | | | | 10 | |
| Elvaloy 4924 | | | | | 10 |
| Elongation at break, % | 280 | 280 | 260 | 190 | 310 |

VII. Examples of PVC/ECTFE Compounds Containing ECTFE-g-MMA Compatibilizer, Flame Retardants and Smoke Suppressants This series of examples demonstrates the effect on the properties improvement when an ECTFE is mixed with plasticized PVC that contains an appropriate amount of flame retardant, and smoke suppressants. Mixing was accomplished using a laboratory Banbury internal mixer.

The tensile properties were measured using flat tapes that were produced using a laboratory single screw extruder. The Cone calorimetry and dielectric properties were measured using compression molded plaques.

| | BLLF30-A PVC compound control | BLLF30-B Compound of PVC/Halar (=100/40) | BLLF30-C Compound of PVC/Halar/ ECTFE-g-PMMA (=100/40/5) | BLLF30-D Compound of PVC/Halar/ Paraloid (=100/40/5) | BLLF30-E Compound of PVC/Halar (=100/45) |
|---|---|---|---|---|---|
| Cone calorimeter, 75 KW/sq m | | | | | |
| peak heat release rate, KW/sq m | 158.76 @ 443 s | 136.26 @ 485 s | 104.14 @ 467 s | 143.52 @ 500 s | 129.81 @ 456 s |
| Avg heat release rate, KW/m2 | 84.32 | 55.84 | 50.56 | 90.2 | 64.12 |
| Total heat release, MJ/sq m | 88.45 | 34.48 | 39.77 | 69.16 | 48.67 |
| Avg effective HOC, MJ/Kg | 13.69 | 5.83 | 5.94 | 11.05 | 7.35 |
| Ext coeff (1/m) | 2.15 | 1.65 | 2.7 | 1.8 | 2.3 |
| Avg specific Ext area, sq m/Kg | 290.58 | 187.1 | 236.4 | 236.66 | 227.49 |
| Tensile, (extruded tapes), 2"/min, extrusion direction, extrusion temp = 202 C. | | | | | |
| Yield stress, psi | 1800 | 2300 | 2350 | 2200 | 2200 |
| Tensile strength, psi | 2300 | 2546 | 2455 | 2475 | 2422 |
| % elongation, | 177 | 156 | 134 | 149 | 130 |
| Elongation ratio = flow direction/transverse direction | 1.1 | 3.8 | 1.5 | 4.5 | 7.7 |

The results of the dielectric properties of these blend compounds are shown in the table below wherein the values are shown as the % improvement from the value of a 100% plasticized PVC compound (BLLF30-A).

| | Improvement in Dielectric Properties | | | |
|---|---|---|---|---|
| Cpmposition | Dielectric Constant 1 KHz | Dielectric Dissipation Factor 1 KHz | Dielectric Constant 1 MHz | Dielectric Dissipation Factor 1 MHz |
| BLLF30-B | 8.0% | 7.8% | 6.3% | 12.0% |
| BLLF30-C | 12.2% | 13.0% | 9.2% | 19.2% |
| BLLF30-D | 8.9% | 13.8% | 6.8% | 7.2% |
| BLLF30-E | 11.3% | 12.8% | 7.7% | 15.2% |

These results show that adding ECTFE to the flexible PVC compound significantly lowers the dielectric properties. In addition, the incorporation of ECTFE Halar 353 to flexible PVC compounds also imparts several unique flame and smoke properties to the blend compounds:

Delayed the time to peak heat release rate;
Decreased the peak heat release rate;
Decreased total heat release;
Surprisingly, the incorporation of ECTFE-g-PMMA to the blends compounds also reduces the mechanical anisotropy of the blend compounds. (BLLF30-C vs BLLF30-B, D, E). For this application, the mechanical anisotropy is defined as the ratio of elongation in the flow direction to the transverse direction.

It is to be understood that the above-described embodiments are simply illustrative of the principles of the invention. Various and other modifications, changes, details and uses may be made by those skilled in the art that will embody the principles of the invention and fall within the spirit and scope thereof.

What is claimed is:

1. A melt-mixed blend comprising:
   a plasticized PVC as a matrix of the blend;
   a fluoropolymer; and
   a compatibilizer having a functionality to improve the tensile properties of the blends.

2. The melt-mixed blend of claim 1 wherein said fluoropolymer is a copolymer of ethylene with perhalogenated monomers.

3. The melt-mixed blend of claim 2 wherein said fluoropolymer is ethylene/chlorotrifluoroethylene copolymer or ethylene/tetrafluoroethylene copolymer.

4. The melt-mixed blend of claim 3 wherein said fluoropolymer further comprises an additional monomer and said additional monomer is selected from the group of perfluoro(propyl vinyl ether), perfluoro(ethyl vinyl ether), perfluorobutyl ethylene, or hexafluoroisobutylene.

5. The melt-mixed blend of claim 1, wherein said functionality of said compatibilizer is selected from the group consisting of acrylate, ester, anhydride, epoxide, or caprolactone.

6. The melt-mixed blend of claim 5 wherein said acrylate functionality is a melt-premix of functional acrylic polymer.

7. The melt-mixed blend of claim 6 wherein the functionality of the functional acrylic polymer is epoxy group or maleic anhydride.

8. The melt-mixed blend of claim 1 wherein said compatibilizer comprises a grafted fluoropolymer and the grafting is done by melt mixing a fluorine containing polymer having hydrogen atoms bonded to main chain carbon atoms, a grafting compound, and a radical-forming agent.

9. The melt-mixed blend of claim 8 wherein said grafted fluoropolymer is further purified by precipitation into cold acetone from a hot xylene solution.

10. The melt-mixed blend of claim 8 wherein said grafting functionality is selected from the group consisting of methyl methacrylate, butyl methacrylate, vinyl acetate, or butyl acrylate.

11. The melt-mixed blend of claim 8 wherein said grafting compound is a mixture of methyl methacrylate and styrene.

12. The melt-mixed blend of claim 8 wherein said radical forming agent is peroxide.

13. The melt-mixed blend of claim 1 wherein said compatibilizer comprises a blend of grafted fluoropolymers.

14. The melt-mixed blend of claim 1 wherein said fluoropolymer comprises a grafted fluoropolymer.

15. The melt-mixed blend of claim 1 wherein said fluoropolymer comprises a blend of grafted fluoropolymers.

16. The melt-mixed blend of claim 1 wherein the melt blending is done under high shear.

17. The melt-mixed blend of claim 1, wherein said fluoropolymer concentration ranges from about 3 wt % to about 40 wt % total weight of the blend.

18. The melt-mixed blend of claim 1, wherein said compatibilizer concentration ranges from about 2 wt % to about 30 wt % total weight of the blend.

19. The melt-mixed blend of claim 1, wherein said fluoropolymer is a partially fluorinated fluoropolymer containing hydrogen.

20. The melt-mixed blend of claim 1 wherein said fluoropolymer is a vinylidene fluoride polymer.

21. The melt-mixed blend of claim 20 wherein said fluoropolymer is hexafluoropropylene, chlorotrifluoroethylene, tetrafluoroethylene, or tetrafluoroethylene/hexafluoropropylene copolymer with vinylidene fluoride.

22. The melt-mixed blend of claim 1 wherein said plasticized PVC contains a flame retardant and/or a smoke suppressant.

* * * * *